US011706747B2

(12) United States Patent
Chan et al.

(10) Patent No.: US 11,706,747 B2
(45) Date of Patent: Jul. 18, 2023

(54) INTELLIGENT ADAPTIVE CHANNEL SWITCHING GAMING ROUTER

(71) Applicant: Razer (Asia-Pacific) Pte. Ltd., Singapore (SG)

(72) Inventors: Chee Oei Chan, Singapore (SG); Kah Yong Lee, Singapore (SG)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 85 days.

(21) Appl. No.: 17/260,906

(22) PCT Filed: Jul. 26, 2018

(86) PCT No.: PCT/SG2018/050372
§ 371 (c)(1),
(2) Date: Jan. 15, 2021

(87) PCT Pub. No.: WO2020/022952
PCT Pub. Date: Jan. 30, 2020

(65) Prior Publication Data
US 2021/0266900 A1   Aug. 26, 2021

(51) Int. Cl.
*H04W 72/04* (2023.01)
*H04W 72/08* (2009.01)
(Continued)

(52) U.S. Cl.
CPC ....... *H04W 72/0453* (2013.01); *H04W 72/54* (2023.01); *H04W 88/08* (2013.01)

(58) Field of Classification Search
None
See application file for complete search history.

(56) References Cited

U.S. PATENT DOCUMENTS 7,450,904 B2   11/2008   Cave et al.
8,179,838 B2    5/2012   Tang et al.
(Continued)

FOREIGN PATENT DOCUMENTS

TW            I478614 B       3/2015
WO     WO 2017/129077 A1     8/2017

OTHER PUBLICATIONS

Mishra, et al. "QoS based Spectrum Decision Framework for Cognitive Radio Networks", School of Computer Engineering, Nanyang Technological University in 6 pages.
(Continued)

*Primary Examiner* — Saba Tsegaye
(74) *Attorney, Agent, or Firm* — Polsinelli PC

(57) ABSTRACT

A method, a computer-readable medium, and an apparatus (e.g., a router) for wireless communication are provided. The apparatus may determine to switch operations from a first radio frequency channel to a second radio frequency channel. The apparatus may analyze content of data packets handled by the apparatus. The apparatus may determine whether at least one online game is running on a set of devices connected to the apparatus based on the analysis of the content of the data packets. The apparatus may delay the switching of the operations from the first radio frequency channel to the second radio frequency channel when the at least one online game is miming on the set of devices connected to the apparatus.

16 Claims, 5 Drawing Sheets

(51) Int. Cl.
*H04W 72/0453* (2023.01)
*H04W 72/54* (2023.01)
*H04W 88/08* (2009.01)

(56) References Cited

U.S. PATENT DOCUMENTS

| | | |
|---|---|---|
| 8,743,809 B2 | 6/2014 | Vashi et al. |
| 8,817,722 B2 | 8/2014 | Dwivedi et al. |
| 8,923,225 B2 | 12/2014 | Sydor et al. |
| 9,019,830 B2 | 4/2015 | Delay et al. |
| 9,635,649 B1 | 4/2017 | Amiri et al. |
| 9,913,178 B2 | 3/2018 | Lee et al. |
| 2009/0067354 A1 | 3/2009 | Gao et al. |
| 2010/0267414 A1 | 10/2010 | Backes et al. |
| 2013/0089039 A1 | 4/2013 | Vashi et al. |
| 2013/0100803 A1 | 4/2013 | Menchaca et al. |
| 2013/0265989 A1 | 10/2013 | Gazzard |
| 2015/0103680 A1 | 4/2015 | Anand et al. |
| 2016/0050683 A1 | 2/2016 | Gupta et al. |
| 2016/0227535 A1* | 8/2016 | Sharma ............ H04W 72/0453 |
| 2017/0111854 A1 | 4/2017 | Ho et al. |
| 2017/0325102 A1 | 11/2017 | Casebolt et al. |
| 2019/0029072 A1* | 1/2019 | Zhu ...................... H04W 88/06 |

OTHER PUBLICATIONS

International Search Report and Written Opinion, dated Apr. 14, 2019, for the corresponding International Application No. PCT/SG2018/050372 in 14 pages.
Extended European Search Report dated Jul. 2, 2021, 14 pages, for the corresponding European Patent Application No. 18928019.1.
Taiwan Office Action dated Jun. 20, 2022 for corresponding Taiwan Application No. 108123437 (13 pages).

\* cited by examiner

INTELLIGENT ADAPTIVE CHANNEL SWITCHING GAMING ROUTER

CROSS REFERENCE TO RELATED APPLICATIONS

This application is a 35 U.S.C. 371 National Phase Application which claims priority to PCT application PCT/SG2018/050372 having an international filing date of Jul. 26, 2018, which is expressly incorporated by reference herein in its entirety.

TECHNICAL FIELD

Various aspects of this disclosure generally relate to wireless communication systems, and more particularly, to a channel switching router.

BACKGROUND

Most of the advanced Wi-Fi access points (e.g., Wi-Fi routers) are equipped with channel scanning capability which continuously scan for better Wi-Fi channel in the background while performing Wi-Fi functions. A Wi-Fi router switches to a new channel when the operating conditions in current channel is undesirable.

The reason to change frequency channel varies among manufacturers. Below is some of the common reasons:
  Data throughput drop on specific channel;
  Noise environment on specific channel;
  Lots of other applications on the same channel;
  Interference with Bluetooth and/or other RF devices;
  A cleaner channel is available for better performance;
  A radar signal is detected if current channel belongs to Dynamic Frequency Selection (DFS) channels.

However, while a router is switching to a new channel, a user might experience momentarily disconnection if he/she is using real-time applications (e.g. online gaming, online chat, etc.). The reconnection time during frequency channel switching varies according to the hardware of the devices. The user might encounter unpleasant gaming experience due to the slow reconnection response. It may be desirable to develop a better mechanism to control frequency channel switching in order to minimize the unpleasant user experience.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus (e.g., a router) for wireless communication are provided. The apparatus may determine to switch operations from a first radio frequency channel to a second radio frequency channel. The apparatus may analyze content of data packets handled by the apparatus. The apparatus may determine whether at least one online game is running on a set of devices connected to the apparatus based on the analysis of the content of the data packets. The apparatus may delay the switching of the operations from the first radio frequency channel to the second radio frequency channel when the at least one online game is running on the set of devices connected to the apparatus.

In another aspect of the disclosure, an apparatus for wireless communication is provided. The apparatus may include a channel switching engine configured to determine to switch operations of the apparatus from a first radio frequency channel to a second radio frequency channel. The apparatus may include a database configured to store a set of unique signatures of a particular category of application. The apparatus may include a quality of service engine configured to determine, based on the set of unique signatures stored in the database, whether the particular category of applications is running on a set of devices connected to the apparatus. The channel switch engine may be further configured to delay the switching of the operations of the apparatus from the first radio frequency channel to the second radio frequency channel when the particular category of applications is running on the set of devices connected to the apparatus.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
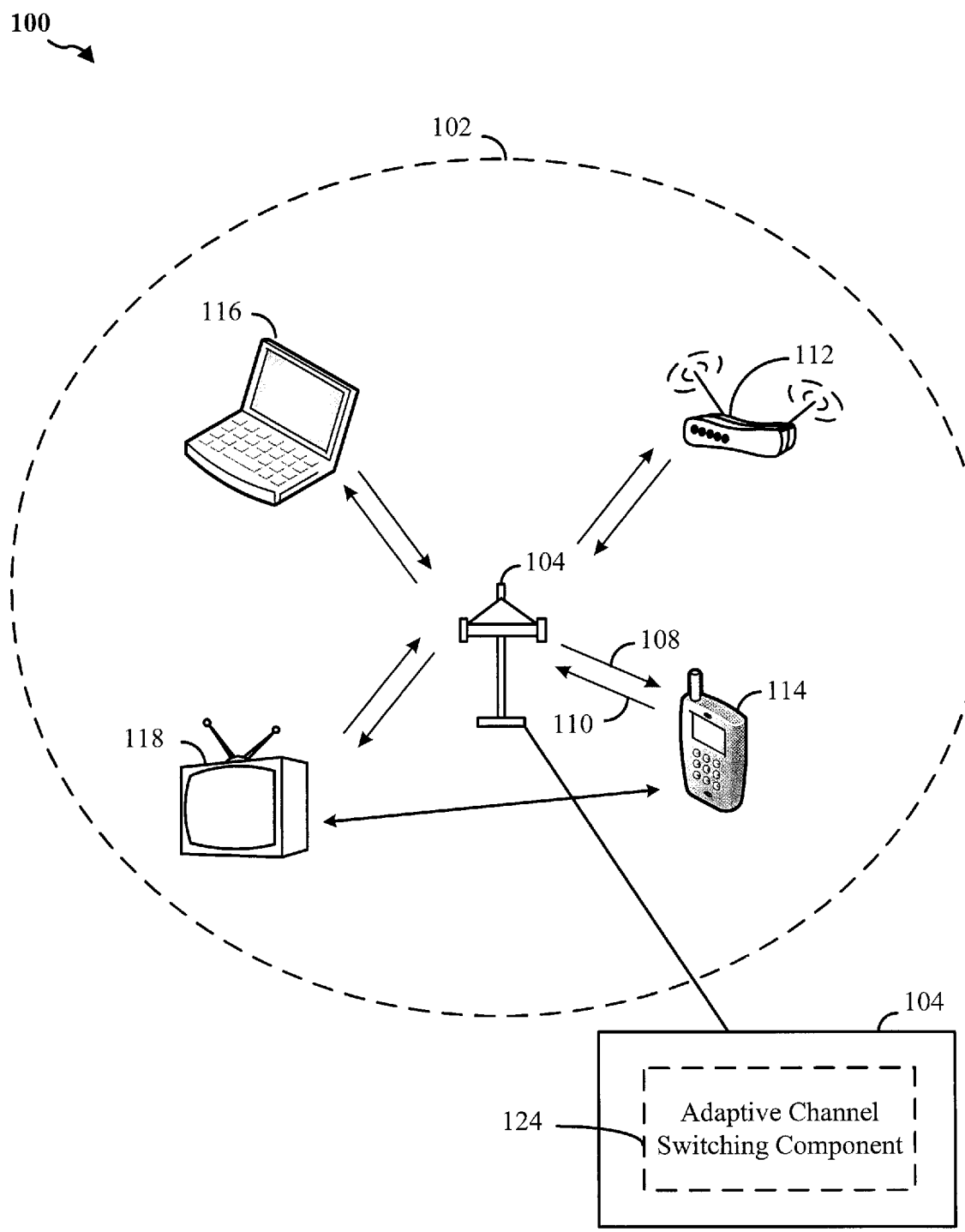
FIG. 1 shows an example wireless communication system in which aspects of the present disclosure may be employed.

Various aspects of systems, apparatuses, computer-readable medium, and methods are described more fully hereinafter with reference to the accompanying drawings. The disclosure may, however, be embodied in many different forms and should not be construed as limited to any specific structure or function presented throughout the disclosure. Rather, the various aspects are provided so that the disclosure will be thorough and complete, and will fully convey the scope of the disclosure to those skilled in the art. Based on the teachings herein one skilled in the art should appreciate that the scope of the disclosure is intended to cover any aspect of the systems, apparatuses, computer program products, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method, which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of the particular aspects fall within the scope of the disclosure. Although some benefits and advantages of aspects may be mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of aspects of the disclosure. The detailed description and drawings are merely illustrative of the disclosure rather than limiting, the scope of the disclosure being defined by the appended claims and equivalents thereof.

Wireless network technologies may include various types of WLANs. A WLAN may be used to interconnect nearby devices together, employing networking protocols. The various aspects described herein may apply to various communication standards, e.g., a wireless protocol standard.

In some aspects, wireless signals may be transmitted according to an IEEE 802.11 protocol using orthogonal frequency-division multiplexing (OFDM), direct-sequence spread spectrum (DSSS) communications, a combination of OFDM and DSSS communications, or other schemes. Implementations of the IEEE 802.11 protocol may be used for sensors, metering, and smart grid networks. In an aspect, certain devices implementing the IEEE 802.11 protocol may consume less power than devices implementing other wireless protocols, and/or may be used to transmit wireless signals across a relatively long range, for example about one kilometer or longer. In some aspects, wireless signals may be transmitted accordingly to IEEE 802.15.4 protocol for low power communication.

In some implementations, a WLAN may include various devices, e.g., the components that access the wireless network. For example, there may be two types of devices: access points (APs) and clients (also referred to as stations or "STAs"). An AP may serve as a hub or base station for the WLAN and a STA may serve as a user of the WLAN. For example, a STA may be a laptop computer, a personal digital assistant (PDA), a mobile phone, a gaming device, etc. In an example, a STA may connect to an AP via a Wi-Fi™ (e.g., an IEEE 802.11 protocol) compliant wireless link to obtain connectivity to the Internet or to other wide area networks. In another example, a STA may connect to an AP via a wireless network that provides low power communication between devices (e.g., using IEEE 802.15.4 protocol). In some implementations, a STA may also be used as an AP.

An access point may also include, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A station may also include, be implemented as, or known as an access terminal (AT), a subscriber station, a subscriber unit, a mobile station, a remote station, a remote terminal, a user terminal, a user agent, a user device, a user equipment, or some other terminology. In some implementations, a station may include a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into an access point that is connected to a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The term "associate," or "association," or any variant thereof should be given the broadest meaning possible within the context of the present disclosure. By way of example, when a first apparatus associates with a second apparatus, the two apparatuses may be directly associated or intermediate apparatuses may be present. For purposes of brevity, the process for establishing an association between two apparatuses will be described using a handshake protocol that employs an "association request" by one of the apparatus followed by an "association response" by the other apparatus. In some aspects, the handshake protocol may require other signaling, such as by way of example, signaling to provide authentication.

Any reference to an element herein using a designation such as "first," "second," and so forth does not limit the quantity or order of such elements. Rather, such designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

In some embodiments, the problem of momentarily Wi-Fi disconnection caused by dynamic frequency channel switching of access point may be minimized by having an AP to check the nature of the active applications running in the connected devices before making the decision to switch radio frequency (RF) channel. As a result, online gaming experience may be improved by providing uninterrupted Wi-Fi connection by the AP.

FIG. 1 shows an example wireless communication system 100 in which aspects of the present disclosure may be employed. The wireless communication system 100 may operate pursuant to a wireless standard, for example the IEEE 802.11 standard. The wireless communication system 100 may include an AP 104, which communicates with STAs (e.g., STAs 112, 114, 116, and 118).

A variety of processes and methods may be used for transmissions in the wireless communication system 100 between the AP 104 and the STAs. For example, signals may be sent and received between the AP 104 and the STAs in accordance with OFDM/OFDMA techniques, in which case, the wireless communication system 100 may be referred to as an OFDM/OFDMA system. Alternatively, signals may be sent and received between the AP 104 and the STAs in accordance with CDMA techniques, in which case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously/concurrently without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and may provide wireless communication coverage for a basic service area (BSA) 102. A BSA (e.g., the BSA 102) may be the coverage area of an AP (e.g., the AP 104). The AP 104 along with the STAs associated with the AP 104 and that use the AP 104 for communication may be referred to as a basic service set (BSS). In an aspect, the wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit a beacon signal (or simply a "beacon") on one or more channels (e.g., multiple narrow-band channels, each channel including a frequency bandwidth) via a communication link such as the downlink 108, to other nodes (STAs) of the wireless communication system 100, which may help the other nodes (STAs) synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, a STA (e.g., STA 114) may associate with the AP 104 in order to send communications to and/or to receive communications from the AP 104. In one aspect, information for associating may be included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, either from the beacon or from probe response frames, the STA 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the AP 104 may include one or more components for performing various functions. For example, the AP 104 may include an adaptive channel switching component 124. The adaptive channel switching component 124 may be configured to determine to switch operations of the AP 104 from a first radio frequency channel to a second radio frequency channel. The adaptive channel switching component 124 may be configured to determine whether a particular category of applications is running on a set of devices connected to the AP 104. The adaptive channel switching component 124 may be configured to delay the switching of the operations of the AP 104 from the first radio frequency channel to the second radio frequency channel when the particular category of applications is running on the set of devices connected to the AP 104.

In one aspect of the disclosure, a new method for making a channel switching decision by a router (e.g., the AP 104) is provided. The router may consider the nature of the active applications before making a decision to switch frequency channel.

Figure 2:
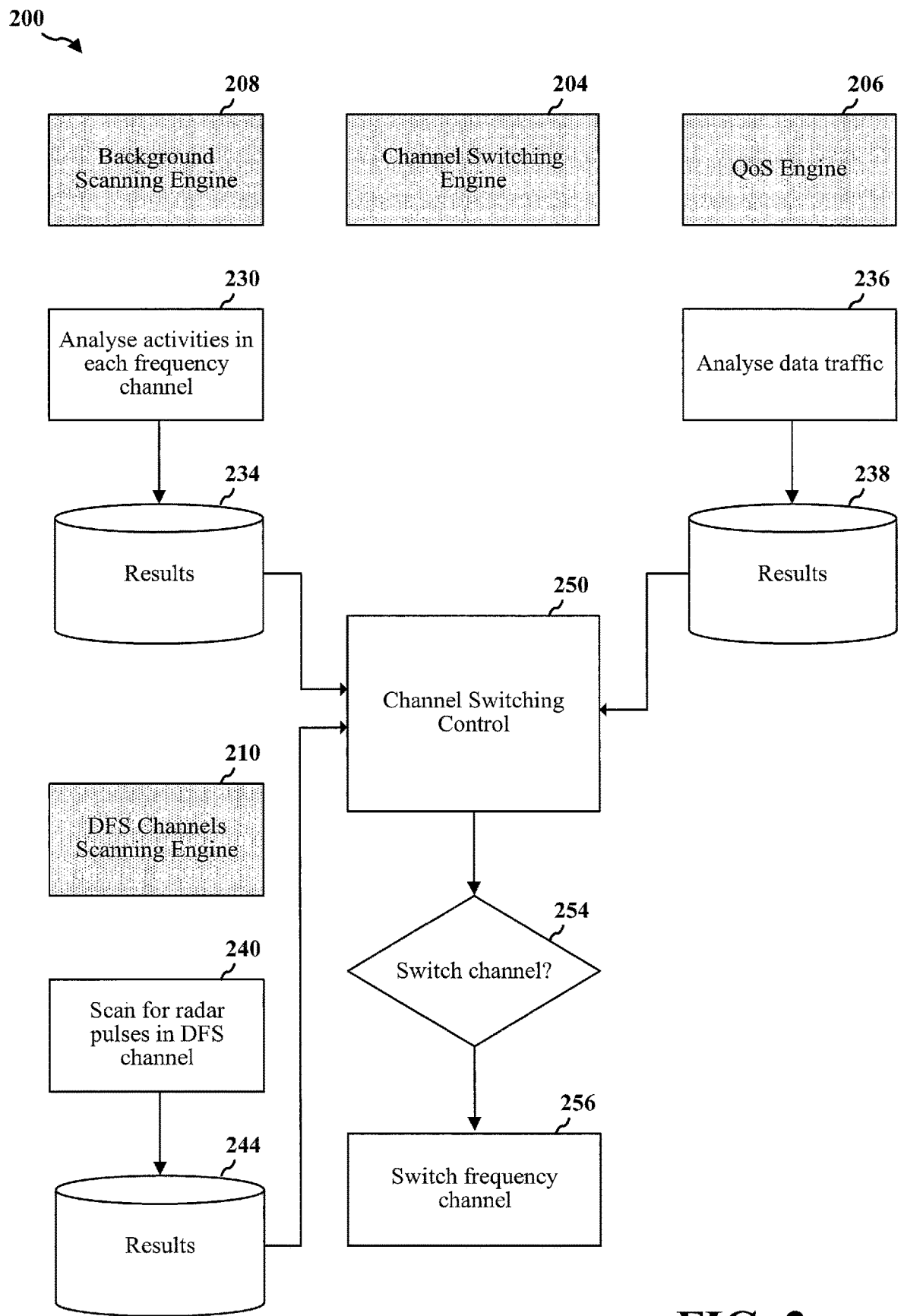
FIG. 2 is a diagram illustrating an example of a router in accordance with some embodiments of the disclosure.

FIG. 2 is a diagram illustrating an example of a router 200 in accordance with some embodiments of the disclosure. In some embodiments, the router 200 may be the AP 104 described above with reference to FIG. 1. In the example, the router 200 may include a channel switching engine 204, a quality of service (QoS) engine 206, a background scanning engine 208, and a DFS channels scanning engine 210.

The channel switching engine 204 includes a channel switching control 250 configured to control the channel switching of the router 200. The channel switching engine 204 may determine (at 254) whether to switch channel based on the output of the channel switching control 250. The channel switching engine 204 may switch (at 256) frequency channel if a determination is made (at 254) to switch.

The background scanning engine 208 may analyze (at 230) activities in each frequency channel. The results 234 are presented to the channel switching control 250. In some embodiments, the background scanning engine 208 may continuously evaluate current channel to determine the network condition, channel bandwidth and all other relevant parameters. At the same time, the background scanning engine 208 may also scan the rest of the Wi-Fi channels to map-out the channels conditions. The DFS channel scanning engine 210 may scan (at 240) for radar pulses in DFS channel. The results 244 are presented to the channel switching control 250.

In some embodiments, the QoS engine 206 may categorize the active applications running on each connected device by analyzing (at 236) the content of the data packets handled by the router 200. The results 238 are presented to the channel switching control 250 for better decision making. In some embodiments, the results 238 may be presented to the channel switching engine 204 via message queue, data pipe, shared memory, etc.

In some embodiments, both the header and the payload of the data packets may be analyzed. In some embodiments, the information being analyzed may include host server name and IP address, application name, protocol used, etc. In some embodiments, the QoS engine 206 may categorize active applications according to nature of the applications. For example, the QoS engine 206 may categorize active applications into the following categories:

Online gaming;
Music and video streaming;
File transfer;
Peer-to-peer (P2P) of file sharing;
Normal traffic.

In some embodiments, in order to determine an active application is an online game, the QoS engine 206 may look for unique signature of each online game. In some embodiments, the signature of each supported online game may be stored in a database in the router 200. The signature of an online game may include but not limited to host IP address of the game, name of the game, etc.

The router 200 may delay the switching decision if the user is currently playing an online game even if there is a better frequency channel for higher data throughput. The router 200 may only switch to a new channel when current channel is not able to support the bandwidth requirement of the online game.

In some embodiments, there are two scenarios that will cause a channel switching. The first scenario is radar signal is detected in current channel. If the router 200 is operated in a DFS channel and radar signal is detected, the router 200 will switch to another channel (a DFS channel is preferable if it is available from the channel map as network traffic is less congested in DFS channel) regardless of the active applications as it is required by regulatory to switch channel under this scenario.

The second scenario is when the channel condition of the current channel is undesirable or unfavorable. If the router 200 is not able to support the requirement from the QoS engine 206 or the network condition has been degraded into poor user experience, the router 200 will switch to another channel (the best channel listed in the channel map). In other words, if there is an active online game and the router 200 is able to support the bandwidth and latency requirement of the online game, the router 200 will delay the channel switching decision.

In some embodiments, the delay of switching decision may cease when the online game is inactive or terminated. The QoS engine 206 may track the data packets for the online game continuously. An inactive event may be identified when data packets are not detected for a period of time (e.g., a threshold length of time). The threshold value may be unique for each online game and the threshold value may be firstly determined by a calibration process. Subsequently, the threshold value may be learnt by a server by studying the requirements according to the actual game play by the users. After that the threshold value may be adjusted dynamically through the server.

In some embodiments, the switching of the physical frequency channel may be performed by Wi-Fi chipset of the router 200. The channel switching engine 204 may evaluate the condition of current channel. The channel switching engine 204 may instruct the Wi-Fi chipset (via device driver) to switch channel when the network condition and network performance is in unfavorable condition.

Figure 3:
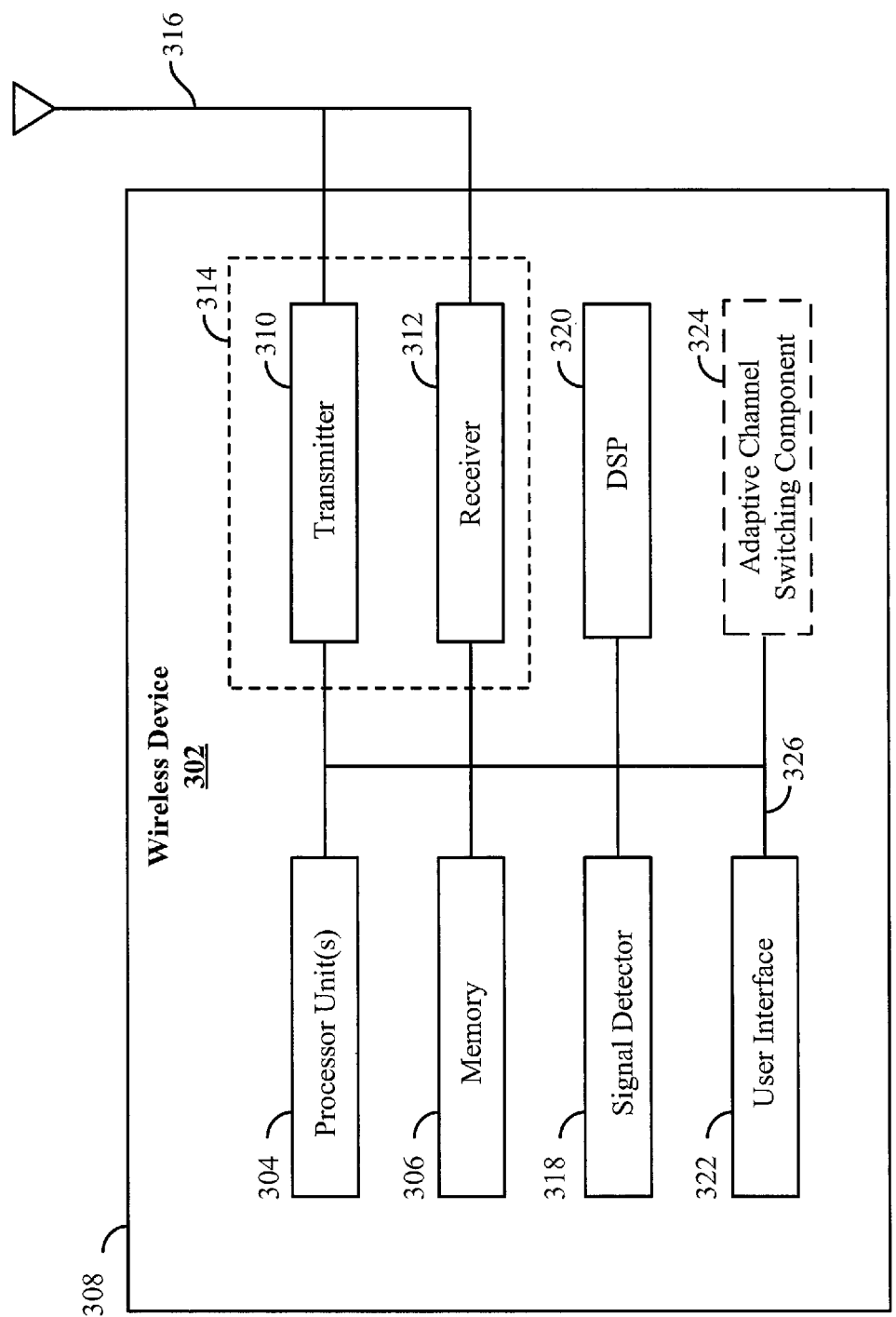
FIG. 3 shows an example functional block diagram of a wireless device that may perform adaptive channel switching.

FIG. 3 shows an example functional block diagram of a wireless device 302 that may perform adaptive channel switching. The wireless device 302 is an example of a device that may be configured to implement the various methods described herein. For example, the wireless device 302 may be the AP 104 or the router 200.

The wireless device 302 may include a processor 304, which controls operation of the wireless device 302. The processor 304 may also be referred to as a central processing unit (CPU). Memory 306, which may include both read-only memory (ROM) and random access memory (RAM), may provide instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable (by the processor 304, for example) to implement the methods described herein.

The processor 304 may include or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include a machine-readable medium for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308, and the wireless device 302 that may include a transmitter 310 and/or a receiver 312 to allow transmission and reception of data between the wireless device 302 and a remote device. The transmitter 310 and the receiver 312 may be combined into a transceiver 314. An antenna 316 may be attached to the housing 308 and electrically coupled to the transceiver 314. The wireless device 302 may also include multiple transmitters, multiple receivers, multiple transceivers, and/or multiple antennas.

The wireless device 302 may also include a signal detector 318 that may be used to detect and quantify the level of signals received by the transceiver 314 or the receiver 312. The signal detector 318 may detect such signals as total energy, energy per subcarrier per symbol, power spectral density, and other signals. The wireless device 302 may also include a DSP 320 for use in processing signals. The DSP 320 may be configured to generate a packet for transmission. In some aspects, the packet may include a physical layer convergence procedure (PLCP) protocol data unit (PPDU).

In some aspects, the wireless device 302 may further include a user interface 322. The user interface 322 may include a keypad, a microphone, a speaker, and/or a display. The user interface 322 may include any element or component that conveys information to a user of the wireless device 302 and/or receives input from the user.

When the wireless device 302 is implemented as a router (e.g., the AP 104), the wireless device 302 may also include an adaptive channel switching component 324. The adaptive channel switching component 324 may be configured to perform each of the functions and/or steps recited in disclosure with respect to FIGS. 1 and 2.

The various components of the wireless device 302 may be coupled together by a bus system 326. The bus system 326 may include a data bus, for example, as well as a power bus, a control signal bus, and a status signal bus in addition to the data bus. Components of the wireless device 302 may be coupled together to accept or provide inputs to each other using some other mechanism.

Although a number of separate components are illustrated in FIG. 3, one or more of the components may be combined or commonly implemented. For example, the processor 304 may be used to implement not only the functionality described above with respect to the processor 304, but also to implement the functionality described above with respect to the signal detector 318, the DSP 320, the user interface 322, and/or the adaptive channel switching component 324. Further, each of the components illustrated in FIG. 3 may be implemented using a plurality of separate elements.

Figure 4:
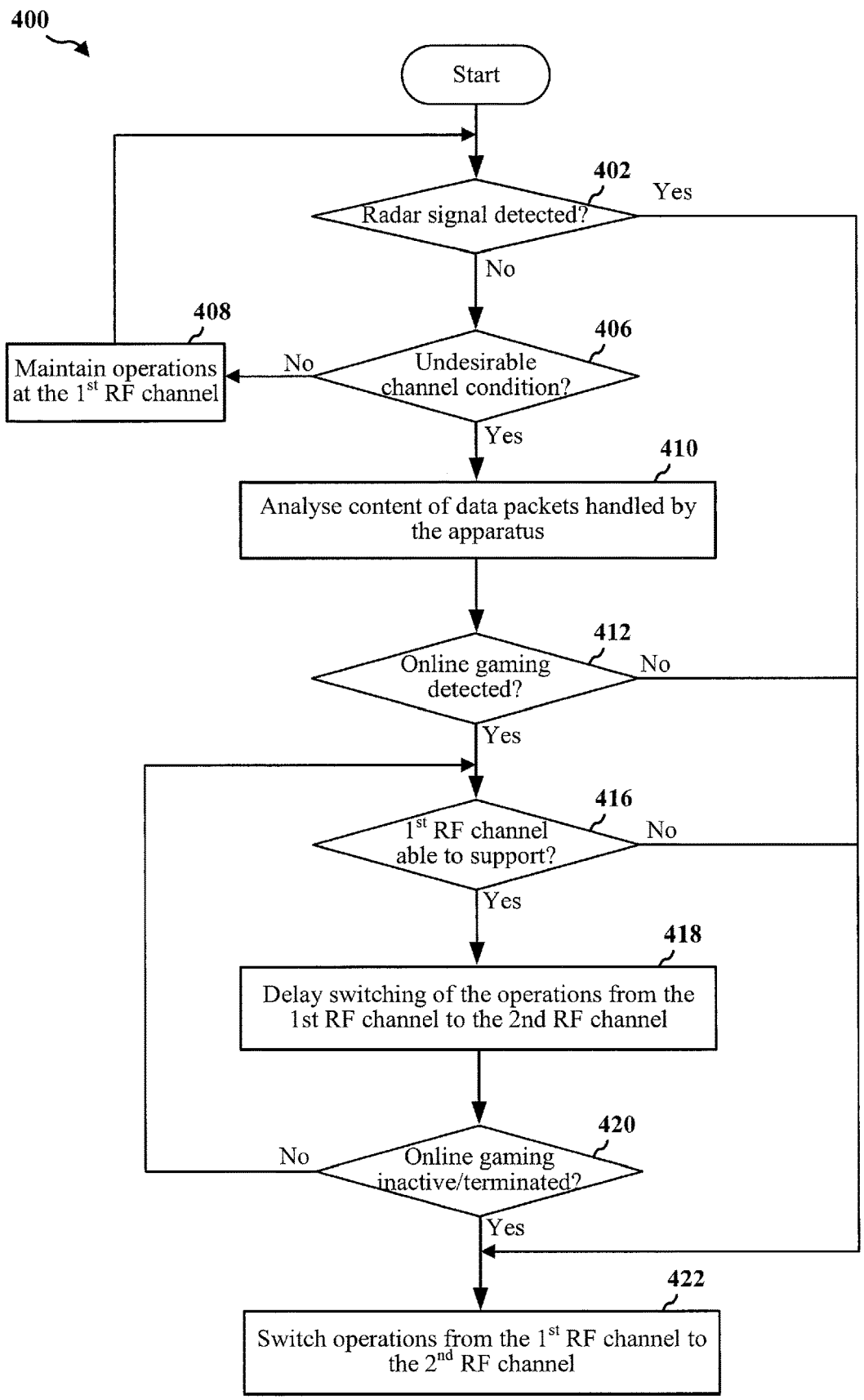
FIG. 4 is a flowchart of an exemplary method of adaptive channel switching.

FIG. 4 is a flowchart of an exemplary method 400 of adaptive channel switching. The method 400 may be performed using an apparatus (e.g., the AP 104, the router 200). Although the method 400 is described below with respect to the elements of wireless device 302 of FIG. 3, other components may be used to implement one or more of the steps described herein. In one embodiment, operations performed in method 400 may be the operations described above with reference to FIG. 2.

At 402, the apparatus may determine whether radar signal is detected in a first RF channel. In some embodiments, the first RF channel is the frequency channel on which the apparatus currently operates. If radar signal is detected, the apparatus may proceed to 422. If radar signal is not detected, the apparatus may proceed to 406.

At 406, the apparatus may determine whether the condition of the first RF channel is undesirable/unfavorable. If the condition of the first RF channel is undesirable/unfavorable, the apparatus may proceed to 410. If the condition of the first RF channel is not undesirable/unfavorable, the apparatus may proceed to 408.

At 408, the apparatus may maintain its operations at the first RF channel. In other words, the apparatus does not switch frequency channel. The apparatus may then loop back to 402.

At 410, the apparatus may analyze content of data packets handled by itself. At 412, the apparatus may determine whether at least one online game is running on a set of devices connected to the apparatus based on the analysis of the content of the data packets. If at least one online game is running on the set of devices connected to the apparatus, the apparatus may proceed to 416. If no online game is running on the set of devices connected to the apparatus, the apparatus may proceed to 422.

In some embodiments, to determine whether at least one online game is running on the set of devices connected to the apparatus, the apparatus may search the content of the data packets to look for unique signatures of online games. In some embodiments, the unique signature of each online game may include at least one of the host Internet Protocol address of the online game or the name of the online game.

At 416, the apparatus may determine whether the first RF channel is able to support the bandwidth requirement of online gaming running on the set of devices connected to the apparatus. If the first RF channel is able to support the bandwidth requirement of online gaming, the apparatus may proceed to 418. If the first RF channel is not able to support the bandwidth requirement of online gaming, the apparatus may proceed to 422.

At 418, the apparatus may delay switching its operations from the first RF channel to a second RF channel. In some embodiments, the second RF channel may be a frequency channel that provides better communication quality and/or bandwidth, thus is more desirable/favorable than the first RF channel.

At 420, the apparatus may determine whether online gaming running on the set of devices connected to the apparatus is inactive or terminated. If online gaming on the set of devices connected to the apparatus is inactive or terminated, the apparatus may proceed to 422. If online gaming on the set of devices connected to the apparatus is active (i.e., not inactive or terminated), the apparatus may loop back to 416.

At 422, the apparatus may switch its operations from the first RF channel to the second RF channel.

Figure 5:
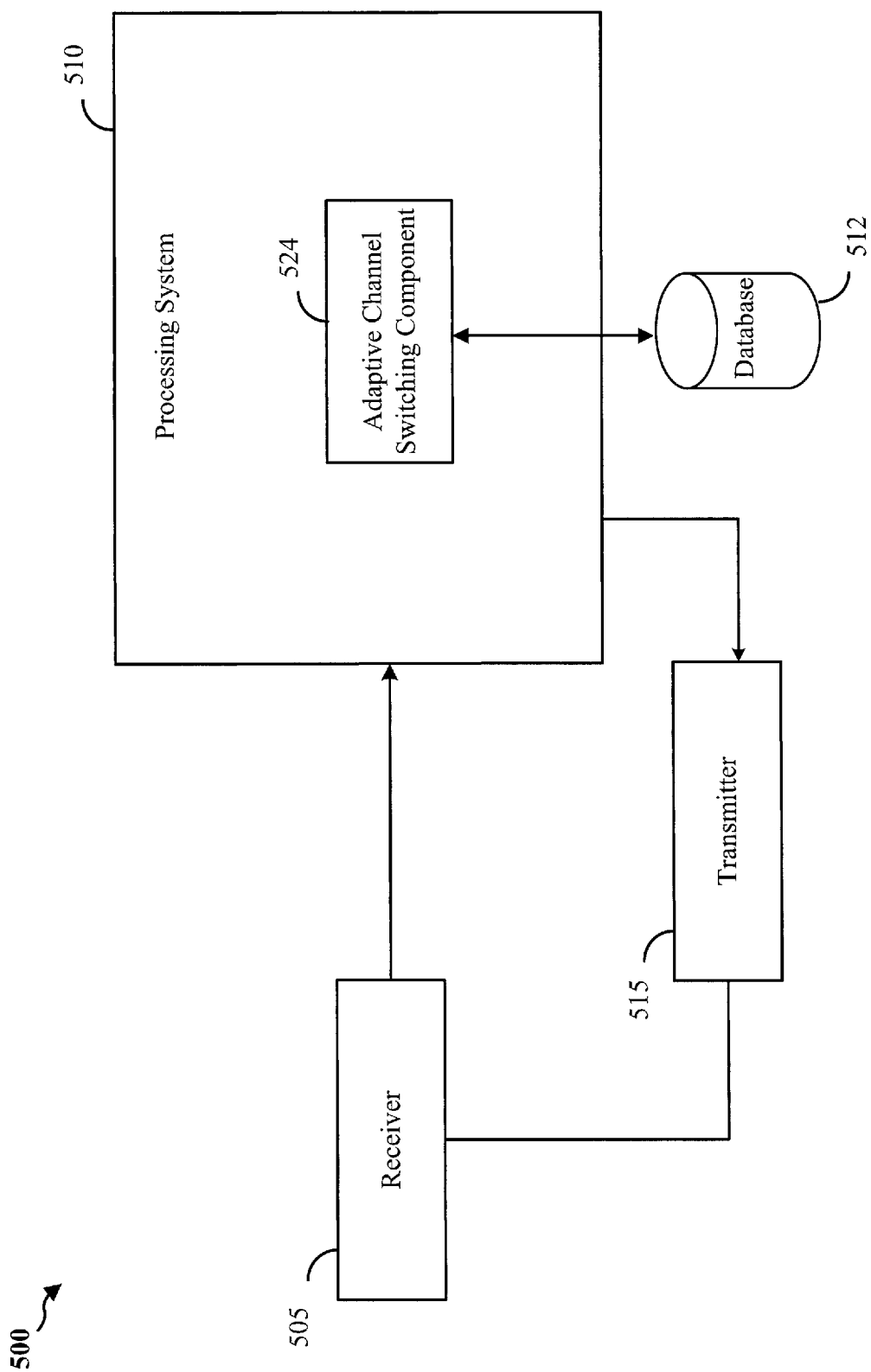
FIG. 5 is a functional block diagram of an example wireless communication device that may perform adaptive channel switching.

FIG. 5 is a functional block diagram of an example wireless communication device 500 that may perform adaptive channel switching. The wireless communication device 500 may include a receiver 505, a processing system 510, a database 512, and a transmitter 515. The processing system 510 may include an adaptive channel switching component 524. The database 512 may store a set of unique signatures of one or more categories of applications (e.g., a set of signatures for online games).

The receiver 505, the processing system 510, the adaptive channel switching component 524, the database 512, and/or the transmitter 515 may be configured to perform one or more functions discussed above with respect to FIGS. 1-4. The receiver 505 may correspond to the receiver 312. The processing system 510 may correspond to the processor 304. The transmitter 515 may correspond to the transmitter 310. The adaptive channel switching component 524 may correspond to the adaptive channel switching component 124, and/or the adaptive channel switching component 324.

The various operations of methods described above may be performed by any suitable means capable of performing the operations, such as various hardware and/or software component(s), circuits, and/or component(s). Generally, any operations illustrated in the Figures may be performed by corresponding functional means capable of performing the operations.

The various illustrative logical blocks, components and circuits described in connection with the present disclosure may be implemented or performed with a general purpose processor, a DSP, an application specific integrated circuit (ASIC), an FPGA or other PLD, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable medium includes both computer storage media and communication media including any medium that facilitates transfer of a computer program from one place to another. A storage media may be any available media that can be accessed by a computer. By way of example, and not limitation, such computer-readable medium can include RAM, ROM, EEPROM, compact disc (CD) ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium includes a non-transitory computer readable medium (e.g., tangible media).

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may include a computer program product for performing the operations presented herein. For example, such a computer program product may include a computer readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein may be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

In the following, various aspects of this disclosure will be illustrated:

Example 1 is a method of wireless communication. The method may include determining to switch operations of an access point from a first radio frequency channel to a second radio frequency channel. The method may include analyzing content of data packets handled by the access point. The method may include determining whether at least one online game is running on a set of devices connected to the access point based on the analyzing of the content of the data packets. The method may include delaying the switching of the operations of the access point from the first radio frequency channel to the second radio frequency channel when the at least one online game is running on the set of devices connected to the access point.

In Example 2, the subject matter of Example 1 may optionally include that the determining of whether the at least one online game is running on the set of devices connected to the access point based on the analyzing of the content of the data packets may include: searching the content of the data packets to look for a unique signature of each online game of the at least one online game.

In Example 3, the subject matter of Example 2 may optionally include that the unique signature of each online game may include at least one of the host Internet Protocol address of the online game or the name of the online game.

In Example 4, the subject matter of any one of Examples 1 to 3 may optionally include that the switching may be delayed when the first radio frequency channel is able to support the bandwidth requirement of the at least one online game.

In Example 5, the subject matter of Example 4 may optionally include that the method may further include switching the operations of the access point from the first radio frequency channel to the second radio frequency channel when the at least one online game is running on the set of devices connected to the access point and the first radio frequency channel is unable to support the bandwidth requirement of the at least one online game.

In Example 6, the subject matter of any one of Examples 1 to 5 may optionally include that the determining to switch the operations of the access point may include one of: detecting a radar signal in the first radio frequency channel; or detecting that the condition of the first radio frequency channel is undesirable.

In Example 7, the subject matter of any one of Examples 1 to 6 may optionally include that the method may further include ceasing the delaying of the switching when the at least one online game is inactive or terminated at the set of devices connected to the access point.

Example 8 is an apparatus for wireless communication. The apparatus may include a channel switching engine configured to determine to switch operations of the apparatus from a first radio frequency channel to a second radio frequency channel. The apparatus may include a database configured to store a set of unique signatures of a particular category of applications. The apparatus may include a quality of service engine configured to determine, based on the set of unique signatures stored in the database, whether the particular category of applications is running on a set of devices connected to the apparatus. The channel switch engine may be further configured to delay the switching of the operations of the apparatus from the first radio frequency channel to the second radio frequency channel when the particular category of applications is running on the set of devices connected to the apparatus.

In Example 9, the subject matter of Example 8 may optionally include that the particular category of applications may be online gaming.

In Example 10, the subject matter of any one of Examples 8 to 9 may optionally include that, to determine whether the particular category of applications is running on the set of devices connected to the apparatus, the quality of service engine may be configured to search content of data packets handled by the apparatus to look for the set of unique signatures.

In Example 11, the subject matter of any one of Examples 8 to 10 may optionally include that each unique signature may include at least one of the host Internet Protocol address of an application of the particular category or the name of the application.

In Example 12, the subject matter of any one of Examples 8 to 11 may optionally include that the switching may be delayed when the first radio frequency channel is able to support the bandwidth requirement of the particular category of applications, where the channel switching engine may be further configured to switch the operations of the apparatus from the first radio frequency channel to the second radio frequency channel when the particular category of applications is running on the set of devices connected to the apparatus and the first radio frequency channel is unable to support the bandwidth requirement of the particular category of applications.

In Example 13, the subject matter of any one of Examples 8 to 12 may optionally include that the apparatus may further include: a dynamic frequency selection channels scanning engine configured to detect radar signal in the first radio frequency channel; and a background scanning engine configured to detect a undesirable condition of the first radio frequency channel, where the channel switching engine may determine to switch the operations of the apparatus from the first radio frequency channel to the second radio frequency channel based on the detected radar signal in the first radio frequency channel or the detected undesirable condition of the first radio frequency channel.

In Example 14, the subject matter of any one of Examples 8 to 13 may optionally include that the channel switching engine may be further configured to cease the delay of the switching when the particular category of applications is inactive or terminated at the set of devices connected to the apparatus.

Example 15 is a method of wireless communication. The method may include determining to switch operations of an access point from a first radio frequency channel to a second radio frequency channel. The method may include determining whether a particular category of applications is running on a set of devices connected to the access point. The method may include delaying the switching of the operations of the access point from the first radio frequency channel to the second radio frequency channel when the particular category of applications is running on the set of devices connected to the access point.

In Example 16, the subject matter of Example 15 may optionally include that the particular category of applications may be online gaming.

In Example 17, the subject matter of any one of Examples 15 to 16 may optionally include that the determining of whether the particular category of applications is running on the set of devices connected to the access point may include: analyzing content of data packets handled by the access point.

In Example 18, the subject matter of any one of Examples 15 to 17 may optionally include that the switching may be delayed when the first radio frequency channel is able to support the bandwidth requirement of the particular category of applications, where the method may further include: switching the operations of the access point from the first radio frequency channel to the second radio frequency channel when the particular category of applications is running on the set of devices connected to the access point and the first radio frequency channel is unable to support the bandwidth requirement of the particular category of applications.

In Example 19, the subject matter of any one of Examples 15 to 18 may optionally include that the determining to switch the operations of the access point may include one of: detecting radar signal in the first radio frequency channel; or detecting that the condition of the first radio frequency channel is undesirable.

In Example 20, the subject matter of any one of Examples 15 to 19 may optionally include that the method may further include ceasing the delaying of the switching when the particular category of applications is inactive or terminated at the set of devices connected to the access point.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(1), unless the element is expressly recited using the phrase "means for" or, in the case of a method claim, the element is recited using the phrase "step for."

What is claimed is:

1. A method of wireless communication, the method comprising:
    evaluating channel conditions of a first radio frequency channel and a second radio frequency channel for an access point operating on the first radio frequency channel;
    analyzing content of data packets handled by the access point;
    determining whether at least one online game is running on a set of devices connected to the access point based on the analyzing of the content of the data packets;
    determining whether the first radio frequency channel is able to support a bandwidth and latency requirement of the at least one online game; and
    when the first radio frequency channel is able to support the bandwidth and latency requirement of the at least one online game:
        delaying switching the access point from operating on the first radio frequency channel to operating on the second radio frequency channel when the at least one online game is running on the set of devices connected to the access point;
    determining that the at least one online game is inactive or terminated by tracking the data packets associated with the at least one online game; and
    switching the access point from operating on the first radio frequency channel to operating on the second radio frequency channel when an absence of the data packets associated with the at least one online game is tracked for a threshold length of time; and
    when the first radio frequency channel is unable to support the bandwidth and latency requirement of the at least one online game, switching the access point from operating on the first radio frequency channel to operating on the second radio frequency channel.

2. The method of claim 1, wherein the determining of whether the at least one online game is running on the set of devices connected to the access point based on the analyzing of the content of the data packets comprises:
    searching the content of the data packets to look for a unique signature of each online game of the at least one online game.

3. The method of claim 2, wherein the unique signature of each online game comprises at least one of a host Internet Protocol address of the online game or a name of the online game.

4. The method of claim 1, wherein the threshold length of time is unique for each online game.

5. The method of claim 1, further comprising:
immediately prior to evaluating the channel conditions of the first radio frequency channel and the second radio frequency channel, determining whether a radar signal in the first radio frequency channel is detected,
wherein when the radar signal in the first radio frequency channel is detected, the method proceeds directly to switching the access point from operating on the first radio frequency channel to operating on the second radio frequency channel.

6. The method of claim 4, wherein the threshold length of time is firstly determined by a calibration process and subsequently machine learnt by a server by studying requirements in accordance with actual games played by users.

7. The method of claim 4, wherein the threshold length of time is adjusted dynamically through the server.

8. An apparatus for wireless communication, the apparatus comprising:
a background scanning engine configured to evaluate channel conditions of a first radio frequency channel and a second radio frequency channel, the apparatus operating on the first radio frequency channel;
a quality of service engine configured to determine whether a particular category of application is running on a set of devices connected to the apparatus based on analyzing content of data packets by the apparatus; and
a channel switching engine configured to determine to switch the apparatus from operating on the first radio frequency channel to operating on the second radio frequency channel based on outputs from the background scanning engine and the quality service engine,
wherein the apparatus is configured to determine whether the first radio frequency channel is able to support a bandwidth requirement of the particular category of applications,
when the first radio frequency channel is able to support a bandwidth and latency requirement of the at least one online game:
the channel switch engine is further configured to delay switching the apparatus from operating on the first radio frequency channel to operating on the second radio frequency channel when the particular category of applications is running on the set of devices connected to the apparatus; and
the quality of service engine is further configured to track data packets associated with the particular category of applications, and the channel switch engine is further configured to switch the apparatus from operating on the first radio frequency channel to operating on the second radio frequency channel when an absence of the data packets associated with the particular category of applications is tracked for a threshold length of time; and
when the first radio frequency channel is unable to support the bandwidth and latency requirement of the at least one online game, the channel switch engine is further configured to switch the apparatus from operating on the first radio frequency channel to operating on the second radio frequency channel.

9. The apparatus of claim 8, wherein the particular category of applications is online gaming.

10. The apparatus of claim 8, wherein, when determine whether the particular category of applications is running on the set of devices connected to the apparatus based on analyzing content of data packets by the apparatus, the quality of service engine is configured to:
search content of data packets handled by the apparatus to look for a set of unique signatures.

11. The apparatus of claim 8, wherein each unique signature comprises at least one of a host Internet Protocol address of an application of the particular category or a name of the application.

12. The apparatus of claim 8, further comprising:
a dynamic frequency selection channels scanning engine configured to detect a radar signal in the first radio frequency channel,
wherein when the radar signal in the first radio frequency channel is detected, the channel switching engine proceeds directly to switching the access point from operating on the first radio frequency channel to operating on the second radio frequency channel.

13. A method of wireless communication, the method comprising:
evaluating channel conditions of a first radio frequency channel and a second radio frequency channel for an access point operating on the first radio frequency channel;
determining whether a particular category of applications is running on a set of devices connected to the access point;
determining whether the first radio frequency channel is able to support a bandwidth and latency requirement of the at least one online game; and
when the first radio frequency channel is able to support a bandwidth and latency requirement of the at least one online game:
delaying switching the access point from operating on the first radio frequency channel to operating on the second radio frequency channel when the particular category of applications is running on the set of devices connected to the access point,
determining that the particular category of applications is inactive or terminated by tracking data packets associated with the particular category of applications; and
switching the access point from operating on the first radio frequency channel to operating on the second radio frequency channel when an absence of the data packets associated with the particular category of applications is tracked for a threshold length of time; and
when the first radio frequency channel is unable to support the bandwidth and latency requirement of the at least one online game, switching the access point from operating on the first radio frequency channel to operating on the second radio frequency channel.

14. The method of claim 13, wherein the particular category of applications is online gaming.

15. The method of claim 13, wherein the determining of whether the particular category of applications is running on the set of devices connected to the access point comprises:
analyzing content of data packets handled by the access point.

16. The method of claim 13, further comprising:
immediately prior to evaluating the channel conditions of the first radio frequency channel and the second radio frequency channel, determining whether a radar signal in the first radio frequency channel is detected,
wherein when the radar signal in the first radio frequency channel is detected, the method proceeds directly to switching the access point from operating on the first radio frequency channel to operating on the second radio frequency channel.

\* \* \* \* \*